(12) United States Patent
Ozawa (10) Patent No.: US 10,448,334 B2
(45) Date of Patent: Oct. 15, 2019

(54) WIRELESS COMMUNICATION APPARATUS AND MODE CONTROL METHOD

(71) Applicant: SEIKO EPSON CORPORATION, Tokyo (JP)

(72) Inventor: Tomohiro Ozawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 32 days.

(21) Appl. No.: 15/371,325

(22) Filed: Dec. 7, 2016

(65) Prior Publication Data

US 2017/0164287 A1 Jun. 8, 2017

(30) Foreign Application Priority Data

Dec. 7, 2015 (JP) ................................. 2015-238267

(51) Int. Cl.
| | |
|---|---|
| *H04W 52/02* | (2009.01) |
| *H04W 4/80* | (2018.01) |
| *H04W 88/08* | (2009.01) |
| *H04W 88/06* | (2009.01) |

(52) U.S. Cl.
CPC ........ *H04W 52/0235* (2013.01); *H04W 88/06* (2013.01); *H04W 88/08* (2013.01); *Y02D 70/144* (2018.01)

(58) Field of Classification Search
CPC ... H04W 52/0235; H04W 4/80; H04W 88/06; H04W 88/08; Y02D 70/144; Y02D 70/00; Y02D 70/142; Y02D 70/166
See application file for complete search history.

(56) References Cited

U.S. PATENT DOCUMENTS

| | | | | | |
|---|---|---|---|---|---|
| 5,678,192 | A | * | 10/1997 | Paavonen | H04W 52/0235 340/7.38 |
| 8,842,304 | B2 | * | 9/2014 | Muramoto | H04N 1/00933 358/1.13 |
| 9,413,361 | B1 | * | 8/2016 | Herbeck | H03L 7/0802 |
| 9,510,222 | B2 | * | 11/2016 | Yerramalli | H04B 17/00 |
| 9,510,281 | B2 | * | 11/2016 | Igartua | H04W 52/0209 |
| 9,531,899 | B2 | * | 12/2016 | Morizumi | H04N 1/00904 |
| 9,538,472 | B2 | * | 1/2017 | Tsuzuki | H04W 52/0229 |
| 9,571,694 | B2 | * | 2/2017 | Hirao | H04N 1/3935 |
| 9,756,214 | B2 | * | 9/2017 | Kogure | H04N 1/32771 |

(Continued)

FOREIGN PATENT DOCUMENTS

| | | |
|---|---|---|
| JP | 05-342388 A | 12/1993 |
| JP | 2014179926 A | 9/2014 |

(Continued)

*Primary Examiner* — Brian T O Connor
(74) *Attorney, Agent, or Firm* — Workman Nydegger (57) ABSTRACT

A wireless communication apparatus that operates in any one of multiple modes that differ in power consumption, the apparatus includes: a control unit that controls the switching of the mode; and a wireless communication unit that performs wireless communication, in which, in a case where the control unit disables a first wireless function of the wireless communication unit that operates as an access point for the wireless communication, the control unit enters a first mode that is included in the multiple modes, and in which, in a case where the control unit enables the first wireless function, the control unit switches from the first mode to a second mode that is included in the multiple modes, which has higher power consumption than the first mode.

7 Claims, 3 Drawing Sheets

(56) References Cited

U.S. PATENT DOCUMENTS

| | | | |
|---|---|---|---|
| 9,832,302 B2* | 11/2017 | Takeuchi | H04M 1/7253 |
| 2014/0204407 A1* | 7/2014 | Tokumaru | H04N 1/00891 |
| | | | 358/1.14 |
| 2014/0268222 A1 | 9/2014 | Inoue et al. | |
| 2014/0368863 A1 | 12/2014 | Suzuki et al. | |
| 2015/0154483 A1* | 6/2015 | Yamauchi | G06F 3/1204 |
| | | | 358/1.15 |
| 2015/0268904 A1 | 9/2015 | Inoue et al. | |
| 2015/0378654 A1* | 12/2015 | Asai | H04W 76/15 |
| | | | 358/1.15 |
| 2016/0088168 A1* | 3/2016 | Yamauchi | G06F 3/1204 |
| | | | 358/1.15 |
| 2016/0088554 A1* | 3/2016 | Igartua | H04W 52/0209 |
| | | | 370/311 |
| 2016/0192296 A1* | 6/2016 | Rehan | H04L 65/604 |
| | | | 455/574 |
| 2016/0234748 A1* | 8/2016 | Chrisikos | H04B 15/00 |
| 2016/0277619 A1* | 9/2016 | Asai | H04N 1/00896 |
| 2016/0313950 A1* | 10/2016 | Kimura | G06F 3/1205 |
| 2016/0323477 A1* | 11/2016 | Sumita | H04N 1/00127 |
| 2017/0013667 A1* | 1/2017 | Yang | H04L 43/10 |
| 2017/0041965 A1* | 2/2017 | Watanabe | H04W 76/10 |
| 2017/0111534 A1* | 4/2017 | Tsuzuki | H04W 52/0229 |
| 2018/0084098 A1* | 3/2018 | Takeuchi | H04M 1/7253 |

FOREIGN PATENT DOCUMENTS

| | | |
|---|---|---|
| JP | 2015019350 A | 1/2015 |
| JP | 2015070567 A | 4/2015 |
| JP | 2015154131 A | 8/2015 |

* cited by examiner

WIRELESS COMMUNICATION APPARATUS AND MODE CONTROL METHOD

CROSS REFERENCES TO RELATED APPLICATIONS

The entire disclosure of Japanese Patent Application No. 2015-238267, filed Dec. 7, 2015 is expressly incorporated by reference herein.

BACKGROUND

1. Technical Field

The present invention relates to a wireless communication apparatus and a mode control method.

2. Related Art

A wireless communications apparatus is known that performs wireless communication in compliance with specifications for wireless communication, which are represented by a Wi-Fi scheme.

Furthermore, as a constitution of a main body of a printer, for which a power saving mode is configured, a constitution in which, when wireless reception is detected, a normal mode is configured is known (refer to JP-A-5-342388).

There are several types of schemes for wireless communication. Furthermore, these schemes for wireless communication may differ in processing load that is required of a wireless communication apparatus that performs the wireless communication. For this reason, if the wireless communication apparatus is set to perform the wireless communication in compliance of a certain scheme in any one of the different modes, there is a concern that an operation for the wireless communication will be unstable in one or several of the modes.

SUMMARY

An advantage of some aspects of the invention is that a wireless communication apparatus and a mode control method, in which a mode is suitably controlled in such a manner that wireless communication is performed in a stable manner are provided.

According to an aspect of the invention, there is provided a wireless communication apparatus that enters any one of multiple modes that differ in power consumption and is able to operate, the apparatus including: a control unit that controls the entering of the mode; and a wireless communication unit that performs wireless communication, in which, in a case where the control unit disables a first wireless function of the wireless communication unit that operates as an access point for the wireless communication, the control unit enters a first mode that is included in the multiple modes, and in which, in a case where the control unit enables the first wireless function, the control unit enters a second mode that is included in the multiple modes, which has higher power consumption than the first mode.

With this constitution, in a case where the wireless communication apparatus enables the first wireless function of the wireless communication unit that operates as the access point, the wireless communication apparatus enters the second mode that has higher power consumption than the first mode. Therefore, an operation by the first wireless function that has comparatively high processing load is stabilized.

According to the aspect of the invention, at least in the first mode, a second wireless function of the wireless communication unit that performs the wireless communication through an external access point may be allowed to be enabled.

With this constitution, in a case where the wireless communication unit performs the wireless communication through the external access point, the wireless communication apparatus operates in the first mode, and, in a case where the wireless communication unit operates as the access point, operates in the second mode.

According to the aspect of the invention, the control unit may control the entering of the mode according to a combination of enabling or disabling of the first wireless function and enabling or disabling of the second wireless function.

With this constitution, an optimal mode that stabilizes the operation can be entered according to the combination of the enabling or disabling of the first wireless function and the enabling or disabling of the second wireless function.

According to the aspect of the invention, in the second mode, the control unit may set a clock frequency of a CPU to be higher than the clock frequency that is employed in the first mode.

With this constitution, in the second mode, the clock frequency of the CPU is increased in such a manner that the clock frequency is higher than that in the first mode, and thus the operation by the first wireless function that has comparatively high processing load is stabilized.

According to the aspect of the invention, any one of the first mode and the second mode may be a mode other than a mode that has the highest power consumption among modes that are included in the multiple modes.

With this constitution, any one of the first mode and the second mode that have a power saving effect can be entered.

According to the aspect of the invention, the wireless communication apparatus may further a short-distance wireless communication unit that is able to perform short-distance wireless communication with an external device, in which, in the first mode, by performing the short-distance wireless communication with the external device, the short-distance wireless communication unit may transmit configuration information necessary for the wireless communication with the wireless communication unit in a case where the first wireless function is enabled, to the external device.

With this constitution, the wireless communication apparatus can provide the configuration information necessary for the wireless communication by the first wireless function to the external device using the short-distance wireless communication that is performed in the first mode.

According to the aspect of the invention, by being triggered by the short-distance wireless communication, the control unit may enter the second mode from the first mode and may enable the first wireless function.

With this constitution, an environment can be created in which, by being triggered by the short-distance wireless communication, the wireless communication apparatus automatically enters the second mode and performs the wireless function by the first wireless communication between the wireless communication apparatus itself and the external device.

The technological idea behind the invention is realized by other than the wireless communication apparatus. For example, it is possible that a process that is performed by the wireless communication apparatus, which has been described so far, is perceived as an invention directed to a method (a mode control method). Furthermore, an invention directed to a program that causes a computer to perform such a method can be understood. Furthermore, a computerreadable recording medium on which the program is recorded is established as an invention.

BRIEF DESCRIPTION OF THE DRAWINGS

The invention will be described with reference to the accompanying drawings, wherein like numbers reference like elements.

DESCRIPTION OF EXEMPLARY EMBODIMENTS

An embodiment of the invention will be described with reference to each drawing.

According to the present embodiment, a wireless communication apparatus generally refers to an apparatus that has a wireless communication function and that, for operation, is able to enter any mode of multiple modes that differ in power consumption. Various products, such as a printer, a scanner, a facsimile, a copy machine, and a digital multifunction machine that are equipped with multiple functions that result from combining functions of these products, correspond to examples of the wireless communication apparatus. Of course, the wireless communication apparatus is not limited to these.

Figure 1:
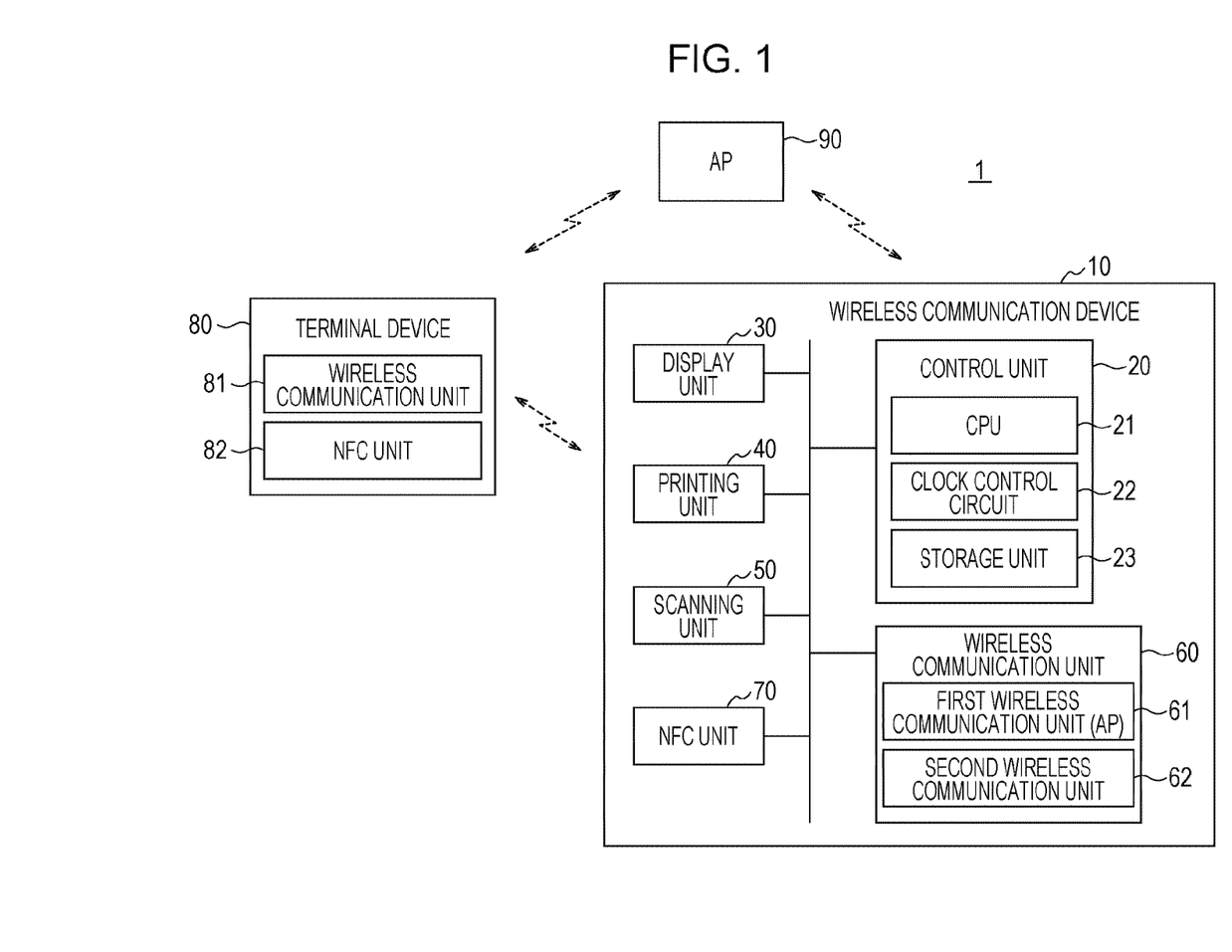
FIG. 1 is a block diagram that schematically illustrates a constitution of a system according to the present embodiment.

FIG. 1 schematically illustrates a constitution of a system 1 according to the present embodiment. FIG. 1 illustrates a wireless communication apparatus 10, a terminal device 80, a relay device (an access point, which is hereinafter referred to an AP) 90.

For example, all terminals, each of which has the wireless communication function, such as a personal computer (PC), a portable telephone, a smartphone, and a tablet type terminal, correspond to the terminal devices 80. In this sense, the terminal device 80 is also one type of wireless communication apparatus. The AP 90 functions as a relay of a wireless local area network (LAN), and has network identification information for identifying a wireless LAN that is managed by the AP 90 itself. The network identification information, for example, a service set identifier (SSID). The AP 90 may have a function of making a connection to a wired LAN, and can also function as a router that performs relaying between the Internet and the LAN.

In FIG. 1, the wireless communication apparatus 10 is illustrated as a multifunction machine that includes a control unit 20, a display unit 30, a printing unit 40, a scanning unit 50, a wireless communication unit 60, an NFC unit 70, and the like. The control unit 20, for example, is constituted to include ICs that have a CPU 21, a ROM, a RAM, and the like. Furthermore, the control unit 20 has a storage unit 23. In the control unit 20, the CPU 21 performs processing according to a program that is stored in a storage medium, such as the ROM or the storage unit 23, and thus controls a behavior of each constitution of the wireless communication apparatus 10. Moreover, according to the present embodiment, processing that is performed by the control unit 20 is set to be one that is performed in software by the CPU 21, as described above, but a portion of the processing may be constituted in such a manner that the portion is performed in software.

The control unit 20 has a clock control circuit 22. The clock control circuit 22 generates a system clock and supplies the system clock to the CPU 21. According to an instruction of the control unit 20, the clock control circuit 22 can change a clock frequency (a clock frequency of the CPU 21) of the system clock that is generated.

The display unit 30 is a part for displaying various pieces of information relating to the wireless communication apparatus 10, and, for example, is constituted to include a liquid crystal display (LCD). The LCD is made to function as a so-called touch panel as well, and thus the display unit 30 may be one portion of an operation-performed unit on which a user operation is performed. Of course, the operation-performed unit may include a physical button in addition to the touch panel. Furthermore, the display unit 30 may include a light emitting source for alerting a state of the wireless communication apparatus 10 to a user with a light emitting state (lighting, blinking, turning light off, or the like). The light emitting source, for example, is a LED.

The printing unit 40 is a mechanism for performing printing, which is based on a printing job that is transmitted from the outside, on a printing medium. Printing schemes that can be employed by the printing unit 40 include various schemes, such as an ink jet scheme and a laser scheme.

The scanning unit 50 is a mechanism for optically reading a document, and has a document loading stand, a light source, an optical system, an imaging element, and the like. Furthermore, the scanning unit 50 may have auto document feeder (ADF) that transports a document that is placed on a document tray.

The control unit 20 controls behaviors of the printing unit 40 or the scanning unit 50 as well. Needless to say, the control unit 20 is also able to cause the printing unit 40 to perform printing that is based on image data which is generated as a result of causing the scanning unit 50 to read a document, that is, to cause the document to be copied. The wireless communication apparatus 10 can be referred to as a printer, in terms of having the printing unit 40. In the same manner, the wireless communication apparatus 10 can be referred to as a scanner in terms of having the scanning unit 50, and the wireless communication apparatus 10 can be referred to as a copy machine in terms of having the printing unit 40 and the scanning unit 50.

The wireless communication unit 60 has a first wireless communication unit 61 that operates as a wireless communication AP, and a second wireless communication unit 62 that performs wireless communication through an external AP (an AP 90 in FIG. 1). Specifically, the first wireless communication unit 61 operates an AP in wireless communication in compliance with Wi-Fi Direct. More precisely, in a state where a function of the first wireless communication unit 61 in the wireless communication apparatus 10 is enabled, the wireless communication apparatus 10 also behaves as an AP. The first wireless communication unit 61 has network identification information (SSID) for identifying the wireless LAN that is managed by the first wireless communication unit 61 itself as an AP. On the other hand, it is possible that wireless communication in compliance with a Wi-Fi scheme is performed with the second wireless communication unit 62. Each of the Wi-Fi scheme and the Wi-Fi Direct scheme is a wireless communication scheme in compliance with IEEE 802.11 that is a set of specifications that are wireless LAN specifications, and is authenticated with Wi-Fi Alliance. A function that is performed by the first wireless communication unit 61 is referred to as a first wireless function, and a function that is performed by a second wireless communication unit 62 is referred to as a second wireless function. In order for the first wireless communication unit 61 to operate as an AP, from the perspective of the wireless communication apparatus 10, a processing load that results when operating the first wireless communication unit 61 is larger than processing load that results when operating the second wireless communication unit 62.

The NFC unit 70 is able to perform wireless communication in compliance with a near field communication (NFC) scheme for so-called short-distance wireless communication. Although not illustrated, the wireless communication apparatus 10 may further have an interface for making a connection to the outside in a wired manner.

The terminal device 80 also has a wireless communication unit 81 that is able to perform the wireless communication in complies with the Wi-Fi scheme or an NFC unit 82 that is able to perform the short-distance wireless communication, as constituents.

The wireless communication apparatus 10, if powered on, is able to operate in any of the multiple modes that differ in power consumption. For operation, the wireless communication apparatus 10 employs any of a normal mode in which the capability that is retained by the wireless communication apparatus 10 is basically not limited, and a power saving mode in which the capability is limited compared with the normal mode and thus power consumption is suppressed more than in the normal mode. The normal mode is one example of a mode in which power consumption is the highest. The power saving mode may be referred to as an energy saving mode, a power-reduced mode, or the like. According to the present embodiment, the wireless communication apparatus 10 is able to employ multiple power saving modes. As power saving modes, a first power saving mode and a second power saving mode that has higher power consumption than the first power saving mode will be mainly described below, but third, fourth, and so forth power saving modes can be present.

First Embodiment

Figure 2:
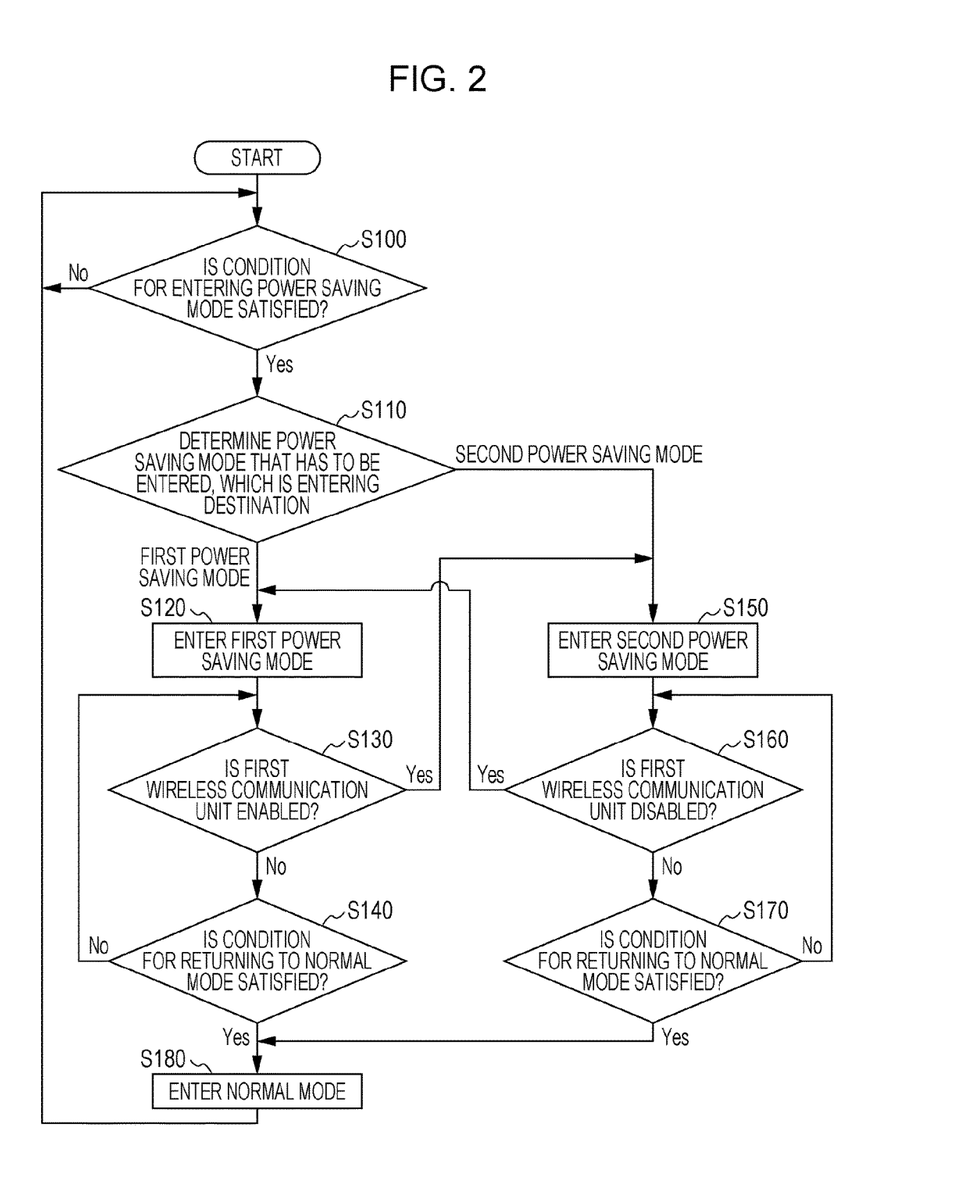
FIG. 2 is a flowchart illustrating mode control processing according to a first embodiment.

FIG. 2 illustrates mode control processing (a mode control method) that is performed by the control unit 20, using a flowchart. The processing is started in a state where a mode employed by the wireless communication apparatus 10 is the normal mode. For convenience, an embodiment that is described with reference to FIG. 2 is referred to as a first embodiment.

In Step S100, the control unit 20 determines whether or not a condition for entering the power saving mode is satisfied. In a case where the condition is satisfied, the control unit 20 proceeds to Step S110, and, in a case where the condition is not satisfied, repeats the determination.

One example of a determination method in Step S100 is described.

For example, a state of each function that the wireless communication apparatus 10 has is stored in the storage unit 23. The functions here are the display unit 30, the printing unit 40, the scanning unit 50, the wireless communication unit 60 (the first wireless communication unit 61 and the second wireless communication unit 62), the NFC unit 70, and the like, referring to an example in FIG. 1. Contents stored in the storage unit 23 are updated at any time according to a situation of the wireless communication apparatus 10. The state of each function is any one of an operating state, a waiting state, and a disabled state.

The operating state refers to a state where an operation is possible without limitation on the capability, and the waiting state refers to a state where the capability or the responsiveness is lower than that in the operation state. Each function suppresses the power consumption in the waiting state, when compared with the operation state. On the other hand, the disable state means a situation where the function is disabled with a user configuration. The user can configure the enabling/disabling of each of the functions of the wireless communication apparatus 10 by operating the operation-performed unit. In a case where a function that is configured to be disabled, the control unit 20 writes to the storage unit 23 the information that the function is disabled. In a case where a function is in the disabled state, the control unit 20 maintains the disabled state as long as the function is thereafter not reconfigured to be enabled. In a case where a function is set to be in the disabled state, the control unit 20 stops the function completely by blocking power supply to the function or by stopping application software that realizes the function. In other words, the function that is not in the disabled state (is enabled) is in any of the operating state and the waiting state.

For example, in a case where a state where prescribed processing by each function that is enabled is not performed continues for a fixed period of time or longer, the function transitions to the waiting state, and notifies the control unit 20 that the function itself is in the waiting state. Furthermore, in a case where each function receives an activation instruction in the waiting state, the function transitions to the operation state, and notifies the control unit 20 that the function itself is in the operating state. For example, reception of the printing job from the outside, an instruction to start copying from the user, or the like corresponds to the activation instruction corresponds, in the case of the printing unit 40, and an instruction to start scanning from the user, an instruction to start copying, or the like corresponds to the activation instruction, in the case of the scanning unit 50. Furthermore, in the case of the display unit 30, any operation on the operation-performed unit by the user, or the like, corresponds to the activation instruction. Furthermore, in the case of the wireless communication unit 60 (the first wireless communication unit 61, and the second wireless communication unit 62) or the NFC unit 70, prescribed communication from the outside, or the like corresponds to the activation instruction.

The control unit 20, when notified of the state described above (state notification) by any function, updates the state of each function, which is stored in the storage unit 23, with the notification. For example, in a case where the control unit 20 receives the state notification from the printing unit 40, the control unit 20 updates the state of the printing unit 40, which is currently stored in the storage unit 23, with contents of the state notification. Then, the control unit 20 determines whether or not the condition for entering the power saving mode is satisfied, referring to the post-update contents stored in the storage unit 23. Various examples are considered as the conditions for entering the power saving mode, but as one example, the control unit 20 sets the condition that all of the display unit 30, the printing unit 40, and the scanning unit 50, which have comparatively high power consumption, among the functions, are not in the operating state (any one of the waiting state and the disabled state), to be the condition for entering the power saving mode. In a case where this prescribed condition for entering the power saving move is satisfied, the control unit 20 can determine in Step S100 that the result is YES, and can proceed to Step S110.

In Step S110, the control unit 20 determines the power saving mode that has to be an entering destination from the normal mode. At this point, a case where the entering destination is determined as any one of a first power saving mode and a second power saving mode is described. If the first wireless communication unit 61 is in the disabled state, the control unit 20 determines the entering destination as the first power saving mode referring to the contents stored in the storage unit 23, and proceeds to Step S120. On the other hand, if the first wireless communication unit 61 is enabled (if in any one of the operating state and the waiting state), the control unit 20 determines the entering destination as the second power saving mode referring to the contents stored in the storage unit 23, and proceeds to Step S150.

In Step S120, the control unit 20 causes the wireless communication apparatus 10 to enter the first power saving mode from a current mode (the normal mode). When entering the first power saving mode from the normal mode, the control unit 20 changes the clock frequency of the CPU 21 from the normal clock frequency that is employed in the normal mode to a first clock frequency that is lower than the normal clock frequency. More precisely, the control unit 20 instructs the clock control circuit 22 to change the clock frequency of the CPU 21 from a current normal clock frequency to the first clock frequency. The normal clock frequency is 768 MHz, and the first clock frequency is 16 MHz, although this is one example.

On the other hand, in Step S150, the control unit 20 causes the wireless communication apparatus 10 to enter the second power saving mode from the current mode (the normal mode). When entering the second power saving mode from the normal mode, the control unit 20 changes the clock frequency of the CPU 21 from the normal clock frequency to a second clock frequency that is lower than the normal clock frequency. More precisely, the control unit 20 instructs the clock control circuit 22 to change the clock frequency of the CPU 21 from the current normal clock frequency to the second clock frequency. Moreover, the second clock frequency is higher than the first clock frequency. The second clock frequency is 64 MHz, although this is one example.

In each power saving mode, as described above, because the function of the printing unit 40 or the like is not in the operating state, the power consumption by the entire wireless communication apparatus 10 is reduced compared with the normal mode. Additionally, in each power saving mode, as described above, the clock frequency is decreased, a speed of the processing by the control unit 20 is decreased, and consequently, the processing capability of the entire wireless communication apparatus 10, which is controlled by the control unit 20, is decreased, but the power consumption can be more reduced.

In the first power saving mode, the user cannot use the first wireless function, but is able to use the second wireless function. More precisely, if in the wireless communication apparatus 10, the second wireless communication unit 62 is enabled, the user, for example, operates the terminal device 80, and thus can perform the wireless communication between the terminal device 80 and the wireless communication apparatus 10 using the Wi-Fi through the AP 90. The first power saving mode is one example of a first mode.

On the other hand, in the second power saving mode, the use can use any one of the first wireless function and a second communication function. In the second power saving mode, in the wireless communication apparatus 10, the first wireless communication unit 61 is enabled. Therefore, if in the wireless communication apparatus 10, the second wireless communication unit 62 is also enabled, the user, for example, operates the terminal device 80, and thus can select any one of the AP 90 and the first wireless communication unit 61 as an AP of a connection destination (selects the SSID), and can perform the wireless communication between the terminal device 80 and the wireless communication apparatus 10 through any selected one as the AP. At this time, in a case where the first wireless communication unit 61 is selected as the AP of the connection destination, the terminal device 80 and the wireless communication apparatus 10 performs direct communication that does not involve the external AP 90, more precisely, communication in compliance with the Wi-Fi Direct. The second power saving mode is one example of a second mode. However, in a situation of the second power saving mode, in a case where the second wireless communication unit 62 is disabled, the user can use the first wireless function, but cannot use the second wireless function.

After entering the first power saving mode in Step S120, the control unit 20 repeatedly determines whether or not an operation of enabling the first wireless communication unit 61 is performed (Step S130). More precisely, in a case where it is determined whether or not an instruction to enable the first wireless communication unit 61, which is provided by the user by performing an operation on the operation-performed unit, is present, and in a case where it is determined that the instruction is present, proceeding to Step S150 takes place. On the other hand, in a case where the instruction to enable the first wireless communication unit 61 is not present, the control unit 20 proceeds to Step S140 from Step S130.

In a case where the proceeding to Step S150 takes place as a result of the determination in Step S130, the control unit 20 causes the wireless communication apparatus 10 to enter the second power saving mode from the current mode (the first power saving mode) and enables the first wireless communication unit 61 that is in the disabled state. More precisely, the control unit 20 changes the clock frequency of the CPU 21 from the first clock frequency to the second clock frequency. Additionally, current stored contents (the disabled state) relating to a state of the first wireless communication unit 61 in the storage unit 23 are erased, application software that realizes the first wireless communication unit 61 is carried out, and so on. Thus, the first wireless communication unit 61 is enabled.

In a case where the proceeding to Step S140 takes place as a result of the determination in Step S130, the control unit 20 determines whether or not a condition for returning the normal mode is satisfied. In a case where the condition is satisfied, the control unit 20 proceeds to Step S180, and, in a case where the condition is not satisfied, repeats processing operations in Step S130 and subsequent steps. In Step S140, the control unit 20 determines whether or not the condition for returning to the normal mode is satisfied, referring to the current contents stored in the storage unit 23. Various examples are considered as the conditions for returning to the normal mode, but as one example, the control unit 20 sets the condition that states of one or more of the display unit 30, the printing unit 40, and the scanning unit 50 are updated with the operating state, to be the condition for returning to the normal mode. In a case where this prescribed condition for returning to the normal mode is satisfied, the control unit 20 can proceed to Step S180 from Step S140.

After entering the second power saving mode in Step S150, the control unit 20 repeatedly determines whether or not an operation of disabling the first wireless communication unit 61 is performed (Step S160). More precisely, in a case where it is determined whether or not an instruction to disable the first wireless communication unit 61, which is provided by the user by performing an operation on the operation-performed unit, is present, and in a case where it is determined that the instruction is present, proceeding to Step S120 takes place. On the other hand, in a case where the instruction to disable the first wireless communication unit 61 is not present, the control unit 20 proceeds to Step S170 from Step S160.

In a case where the proceeding to Step S120 takes place as a result of the determination in Step S160, the control unit 20 disables the first wireless communication unit 61 that is enabled and causes the wireless communication apparatus 10 to enter the first power saving mode from the current mode (the second power saving mode). More precisely, the control unit 20 enables the first wireless communication unit 61, by updating the current stored contents relating to the state of the first wireless communication unit 61 in the storage unit 23, with the disabled state, stopping the application software that realizes the first wireless communication unit 61, and so on. Additionally, the control unit 20 changes the clock frequency of the CPU 21 from the second clock frequency to the first clock frequency.

In a case where the proceeding to Step S170 takes place as a result of the determination in Step S160, the control unit 20 determines whether or not the condition for returning the normal mode is satisfied. In the case where the condition is satisfied, the control unit 20 proceeds to Step S180, and, in the case where the condition is not satisfied, repeats processing operations in Step S160 and subsequent steps. A determination method in Step S170 is the same as that in Step S140.

In Step S180, the control unit 20 causes the wireless communication apparatus 10 to enter the normal mode from the current mode. At this time, if the current mode is the first power saving mode, the control unit 20 changes the clock frequency of the CPU 21 from the first clock frequency to the normal clock frequency. On the other hand, if the current mode is the second power saving mode, the clock frequency of the CPU 21 is changed from the second clock frequency to the normal clock frequency. After entering the normal mode, the control unit 20 repeats processing operations in Step S100 and subsequent steps.

According to the present embodiment, in the wireless communication apparatus 10, in a case where the first wireless communication unit 61 (the first wireless function) of the wireless communication unit 60 that operates as the wireless communication AP is disabled, the control unit 20 enters the first mode (the first power saving mode) that is included in multiple modes. Furthermore, in a case where the first wireless communication unit 61 is enabled, the control unit 20 enters the second mode (the second power saving mode) that has higher power consumption than the first mode, which is included in the multiple modes. Accordingly, when the first wireless communication unit 61 is enabled, operation of the first wireless communication unit 61 that causes comparatively high processing load on the control unit 20 or the wireless communication unit 60 (that causes higher processing load when compared with a case where the second wireless communication unit 62 is enabled) is stabilized. Particularly, in the second mode, processing capability is improved by raising the clock frequency of the CPU 21 more than in the first mode. Accordingly, the operation of the first wireless communication unit 61 is stable. Furthermore, in a case where the first wireless communication unit 61 that operates as an AP is disabled, a larger power saving effect can be achieved by entering the first mode than by remaining in the second mode.

Furthermore, according to the present embodiment, the wireless communication apparatus 10 allows the wireless communication by the second wireless communication unit 62 (the second wireless function) in the first mode. Therefore, it can be said that, in a case where the wireless communication unit 60 performs the wireless communication through the external AP 90, the wireless communication unit 60 operates in the first mode that has a higher power saving effect, and that, in a case where the wireless communication unit 60 operates as an AP, the wireless communication unit 60 operates in the second mode to stabilize the operations as the AP.

The invention is not limited to the embodiment described above, and it is possible that the invention is implemented into various embodiments within the scope that does not depart from the gist of the invention. For example, it is possible that an example which will be described below is employed.

Second Embodiment

Figure 3:
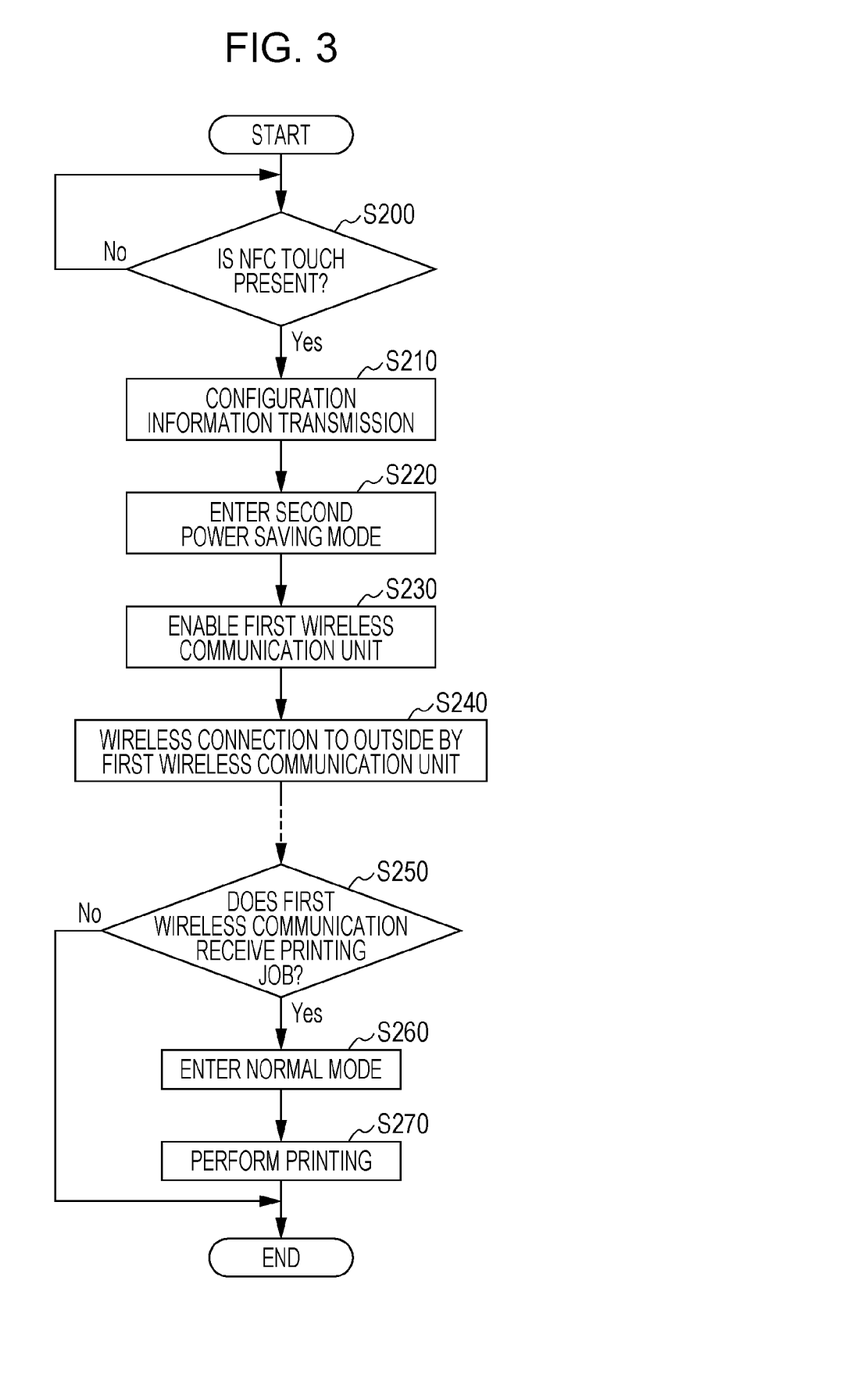
FIG. 3 is a flowchart illustrating processing that includes the mode control processing according to a second embodiment.

FIG. 3 illustrates processing that includes one portion of mode control processing (a mode control method), using a flowchart. The processing is started in a state where the mode that is employed by the wireless communication apparatus 10 is the first power saving mode. An embodiment that is described with reference to FIG. 3 is referred to as a second embodiment.

In Step S200, the control unit 20 monitors whether not a NFC touch to the NFC unit 70 is present, and, in a case where the NFC touch is present, proceeds to Step S210. Specifically, the user brings an external device (for example, the terminal device 80 that has the NFC unit 82), which has a short-distance wireless communication function, in close proximity to the NFC unit 70 of the wireless communication apparatus 10. The NFC unit 70, for example, is set to be an NFC reader and writer. With the proximity to the NFC unit 70, the NFC unit 70 that receives a signal for the short-distance wireless communication from the external device performs interruption for a result of the reception and notifies the control unit 20 of the result of the reception. The control unit 20, when notified of the result of the reception, determines this notification as the "presence of the NFC touch".

In Step S210, the control unit 20 transmits prescribed configuration information to the external device through the NFC unit 70. An SSID for identifying the wireless LAN that is managed by the first wireless communication unit 61 which operates as an AP, a passcode (a password) that is associated with the SSID, or the like, which is configuration information necessary for the wireless communication with the wireless communication unit 60 in a case where the first wireless function is enabled, corresponds to the prescribed configuration information. As a result of the processing in Step S210, the terminal device 80 that the user brings in close proximity to the NFC unit 70 of the wireless communication apparatus 10 can acquire the configuration information through the NFC unit 82. Moreover, only the SSID is transmitted from the NFC unit 70 of the wireless communication apparatus 10 to the terminal device 80, and on the terminal device 80 side, the passcode that is associated with the received SSID may be restored with a prescribed conversion scheme.

In Step S220, the control unit 20 causes the wireless communication apparatus 10 to enter the second power saving mode from the current mode (the first power saving mode). More precisely, by being triggered by the recognition of the "presence of the NFC touch", the control unit 20 transmits the configuration information to the NFC unit 70, and changes the mode. As described also in the first embodiment, when entering the second power saving mode from the first power saving mode, the clock frequency of the CPU 21 is changed from the first clock frequency to the second clock frequency.

In Step S230, the control unit 20 enables the first wireless communication unit 61. More precisely, the current stored contents (the disabled state) relating to the state of the first wireless communication unit 61 in the storage unit 23 are erased, the application software that realizes the first wireless communication unit 61 is carried out, and so on. Thus, the first wireless communication unit 61 is enabled. After the first wireless communication unit 61 is enabled, by the first wireless communication unit 61 operating as an AP, the wireless communication apparatus 10 performs the direct wireless communication without involving the external AP 90 between the wireless communication apparatus 10 itself and the external device (the terminal device 80 that has the wireless communication unit 81), more precisely, the Wi-Fi Direct (Step S240). The wireless communication unit 81 of the terminal device 80 has access to the AP (the first wireless communication unit 61) using the configuration information that is acquired in the short-distance wireless communication with the wireless communication apparatus 10.

According to the flow from Step S200 to Step S240, it can be said that action (action that causes the control unit 20 of the wireless communication apparatus 10 to recognize the "presence of the NFC touch") in which the user brings the terminal device 80 in close proximity to the NFC unit 70 of the wireless communication apparatus 10 corresponds to one type of "the instruction to enable the first wireless communication unit 61" that is described in the first embodiment. More precisely, if it is assumed that the second embodiment is combined with the first embodiment, the control unit 20, when recognizing the "presence of the NFC touch" in Step S130 (FIG. 2), the control unit 20 proceeds to Step S150 and performs Step S210 and subsequent steps.

In a case where the wireless communication apparatus 10 is a printer, the user is able to cause the wireless communication apparatus 10 to perform the printing, using situations in Step S240 and subsequent steps in which the wireless communication between the terminal device 80 and the wireless communication apparatus 10 through the first wireless communication unit 61 (the AP) is established.

In the second power saving mode, the control unit 20 determines whether or not the first wireless communication unit 61 receives the printing job received from the external device (Step S250), and, in a case where the printing job is received, proceeds to Step S260. For example, after the configuration information is acquired using the short-distance wireless communication between the terminal device 80 and the wireless communication apparatus 10, the user performs a different NFC touch (an action that causes the terminal device 80 to bring in close proximity to the NFC unit 70 of the wireless communication apparatus 10). By being triggered by the different NFC touch, as a result of negotiation with the wireless communication unit 81 of the terminal device 80, the printing job is transmitted from the terminal device 80 to the first wireless communication unit 61.

In response to the reception of the printing job, in Step S260, the control unit 20 causes the wireless communication apparatus 10 to enter the normal mode from the current mode (the second power saving mode). In this case, as described also in the first embodiment, the clock frequency of the CPU 21 is changed from the second clock frequency to the normal clock frequency. The flow from Step S250 to Step S260 corresponds to one example of the flow (FIG. 2) from Step S170 to Step S180 in the first embodiment.

The control unit 20 that restores the wireless communication apparatus 10 to the normal mode causes the printing unit 40 to perform the printing that is based on the received printing job (Step S270).

Moreover, after it is determined in Step S250 that the first wireless communication unit 61 does not receive the printing job, the control unit 20 does not perform Steps S260 and S270. However, thereafter, the control unit 20 may repeat the determination in Step S250 and, of course, may enter a determination loop consisting of Steps S160 and S170 (FIG. 2). Furthermore, wireless communication (wireless communication between an external device and the first wireless communication unit 61) for other than the reception of the printing job can be, of course, performed.

According to the second embodiment, in the wireless communication apparatus 10, the NFC unit 70 performs the short-distance wireless communication with the external device in the first mode, and thus transmits the configuration information necessary for the wireless communication with the wireless communication unit 60 in a case where the first wireless communication unit 61 is enabled. Accordingly, the user can easily obtain the configuration information necessary for the wireless communication (the direct wireless communication between the terminal device 80 and the wireless communication apparatus 10) by the first wireless function that does not need the relay by the external AP, while the wireless communication apparatus 10 operates in the first mode. Furthermore, by being triggered by the short-distance wireless communication (the NFC touch) between the external device and the NFC unit 70, the control unit 20 enters the second mode (the second power saving mode) from the first mode (the first power saving mode), and enables the first wireless communication unit 61. Accordingly, with the exceedingly easy operation, such as the NFC touch, the user can easily obtain an environment of the wireless communication (the direct wireless communication between the terminal device 80 and the wireless communication apparatus 10) by the first wireless function that does not need the relay by the external AP.

Moreover, the NFC unit 70 of the wireless communication apparatus 10 may be set to be an interface that also serves as a tag (an NFC tag) having a memory. In this case, the configuration information is written in advance to the memory of the NFC tag. When receiving the signal for the short-distance wireless communication from the external device, the NFC unit 70 performs the interruption for the result of the reception and notifies the control unit 20 of the result of the reception. The control unit 20, when notified of the result of the reception, determines this notification as the "presence of the NFC touch" (Yes in Step S200). Then, the configuration information that is retained by the NFC unit 70 in the NFC tag is acquired by the external device (the terminal device 80 that has the NFC unit 82) using the short-distance wireless communication (Step S210).

Third Embodiment

So far, a constitution has been described in which in a case where the first wireless communication unit 61 is enabled, among the first power saving mode and the second power saving mode, the second power saving mode is entered and in which in a case where the first wireless communication unit 61 is disabled, the first power saving mode is entered. However, the control unit 20 control the entering of the mode, according to a combination of the enabling or disabling of the first wireless communication unit 61 (the first wireless function) and the enabling or disabling of the second wireless communication unit 62 (the second wireless function).

As one example, a third mode that is one mode which is able to be employed the wireless communication apparatus 10 is assumed. The third power saving mode is a mode that has higher power consumption than the second power saving mode. In the third power saving mode, the control unit 20 changes the clock frequency of the CPU 21 to a third clock frequency that is higher than the second clock frequency. The third clock frequency may be the same as the normal clock frequency (for example, 768 MHz), and may be at lower value than the normal clock frequency. Moreover, although the third clock frequency is or is not the same as the normal clock frequency, the wireless communication apparatus 10 in the third power saving mode suppresses the power consumption by setting one or several functions to be in the waiting state, when compared with the normal mode.

In this situation, for example, in a case where the first wireless communication unit 61 is disabled and the second wireless communication unit 62 is disabled, the control unit 20 enters the first power saving mode. Furthermore, in a case where the first wireless communication unit 61 is enabled and the second wireless communication unit 62 is disabled, the control unit 20 enters the second power saving mode. Furthermore, in a case where the first wireless communication unit 61 and the second wireless communication unit 62 are enabled, the control unit 20 enters the third power saving mode. With this constitution, as the load on the wireless communication unit 60 is heavier, the wireless communication apparatus 10 can enter the mode that has higher processing ability. According to the third embodiment, while the first power saving mode is referred to as the first mode, the second power saving mode or the third power saving mode corresponds to the second mode.

Any one of the first mode and the second mode has been described so far as basically corresponding to the power saving mode, but the invention is not limited to this aspect. For example, according to specifications for the wireless communication apparatus 10, among the first mode and the second mode, the second mode that higher power consumption may be the normal mode. Furthermore, according to the present embodiment, the second mode is not limited to a mode that has a higher clock frequency of the CPU when compared with the first mode, and also refers to a mode that has the same clock frequency of the CPU as the first mode, but results in having a higher processing capability (high power consumption) than the first mode.

What is claimed is:

1. A wireless communication apparatus that operates in any one of multiple modes that differ in power consumption, the apparatus comprising:
   a control unit that controls the switching the modes; and
   a wireless communication unit that performs wireless communication,
   wherein, in a case where the control unit enables a first wireless function of the wireless communication unit that operates as an internal wireless access point for the wireless communication in a state of a first power saving mode that is included in the multiple modes, the control unit switches from the first power saving mode to a second power saving mode that is included in the multiple modes, which has higher power consumption than the first power saving mode, the control unit also switches a clock frequency of a CPU from a first frequency associated with the first power saving mode to a second frequency that is higher than the first frequency and lower than a normal mode of the wireless communication unit;
   wherein the first power saving mode and the second power saving mode are neither NFC (Near Field Communication) passive mode nor NFC active mode.

2. The wireless communication apparatus according to claim 1,
   wherein at least in the first power saving mode, a second wireless function of the wireless communication unit that performs the wireless communication through an external access point is allowed to be enabled.

3. The wireless communication apparatus according to claim 2,
   wherein the control unit controls the switching of the mode according to a combination of enabling or disabling of the first wireless function and enabling or disabling of the second wireless function.

4. The wireless communication apparatus according to claim 1,
   wherein any one of the first power saving mode and the second power saving mode is a mode other than a mode that has the highest power consumption among modes that are included in the multiple modes.

5. The wireless communication apparatus according to claim 1, further comprising:
   a short-distance wireless communication unit that is able to perform short-distance wireless communication with an external device,
   wherein, in the first power saving mode, by performing the short-distance wireless communication with the external device, the short-distance wireless communication unit transmits configuration information necessary for the wireless communication with the wireless communication unit in a case where the first wireless function is enabled, to the external device.

6. The wireless communication apparatus according to claim 5,
   wherein by being triggered by the short-distance wireless communication, the control unit switches to the second power saving mode from the first power saving mode and enables the first wireless function.

7. A mode control method that is performed by a wireless communication apparatus that operates in any one of multiple modes that differ in power consumption, the method comprising:
   evaluating states of functions of the wireless communication apparatus;
   switching the wireless communication apparatus to one of a first power saving mode and a second power saving mode included in the multiple modes upon determining that a condition for entering a power saving mode is satisfied based on the states of the functions;

switching a clock frequency of a CPU from a first frequency associated with the first power saving mode to a second frequency that is higher than the first frequency and lower than a normal mode of the wireless communication unit;

operating the wireless communication apparatus in a state of the first power saving mode, wherein, in a case where a first wireless function that operates as wireless access point for wireless communication in a state of the first power saving mode is enabled, switching to the second mode that is included in the multiple modes, wherein the second power saving mode has higher power consumption than the first power saving mode, wherein the first power saving mode and the second power saving mode are low power modes compared to the normal mode of the wireless communication apparatus.

\* \* \* \* \*